Patented July 26, 1932

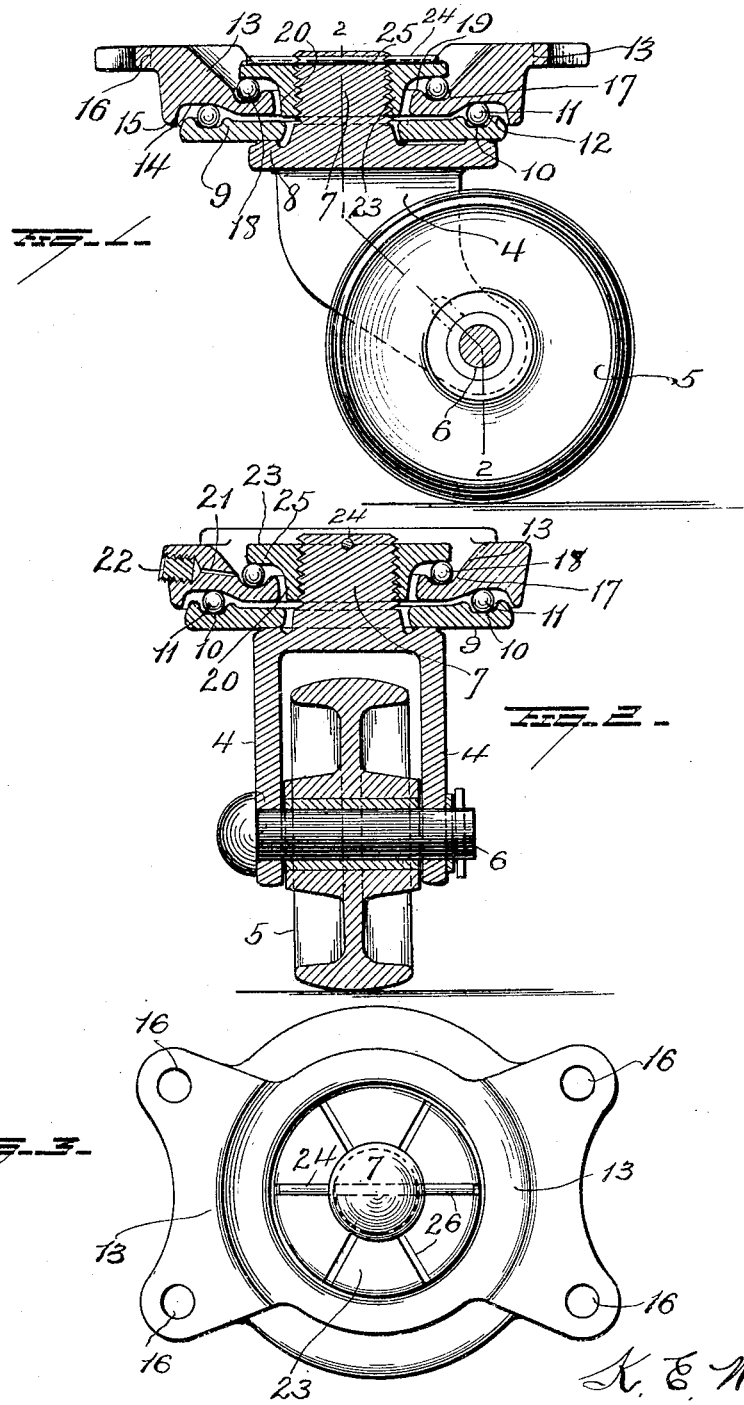

1,868,552

UNITED STATES PATENT OFFICE

KENT E. WALTER, OF ALLIANCE, OHIO, ASSIGNOR TO TRANSUE AND WILLIAMS STEEL FORGING CORPORATION, OF ALLIANCE, OHIO

CASTER

Application filed July 27, 1929. Serial No. 381,477.

This invention relates to improvements in casters, and more particularly to casters adapted to support and to readily turn under very heavy loads.

One of the objects of the invention is to provide a caster of the anti-friction type, and one in which the ball bearings may be effectively lubricated by a cascade system.

Another object is to furnish a caster including upper and lower sets of balls, and with one of the rings of balls having a greater diameter than the other ball annulus.

A further object is to provide a caster of the anti-friction type, in which the race rings are furnished with upstanding flanges to retain the lubricant.

A still further object is to provide a caster including improved means for securing the bearings to the caster shank, and for adjusting the bearings to take up wear.

Another object is to furnish a caster of the ball bearing type, in which clearance spaces are provided to permit side play of the rings.

With the foregoing objects outlined and with other objects in view which will appear as the description proceeds, the invention consists in the novel features hereinafter described in detail, illustrated in the accompanying drawing, and more particularly pointed out in the appended claims.

Referring to the drawing,

Fig. 1 is a vertical sectional view of the improved caster.

Fig. 2 is an other section, taken on the line 2—2 of Fig. 1.

Fig. 3 is a top plan view.

In the drawing, 4 designates the fork of the caster to which a wheel 5 is connected by a pin or bolt 6. The shank 7 of the caster is threaded, and between the shank and the fork, a shelf 8 is arranged. This shelf supports a lower race ring 9, having an annular groove 10, in its upper face, to confine or act as a guideway for an annulus of bearing balls 11. The outer wall of the groove 10 is extended upwardly to provide at the edge of the ring, an upstanding annular flange 12, which will prevent lubricant from flowing outwardly from the groove 10.

An upper race ring 13 rests on the balls 11, and the underside of this ring is provided with a wide groove 14, the surface of which merges into a depending annular flange 15, which overlaps the flange 12 to assist in preventing the lubricant from discharging radially.

The upper ring 13 forms a plate or bracket having apertures 16 to receive the screws or the like which are employed in securing the caster to the article to be supported. An annular groove 17 in the upper face of the ring 13 accommodates an annulus of bearing balls 18, and this annulus is smaller than the one formed by the lower balls 11.

An annular upstanding flange 19 is provided at the inner edge of the ring 13, and lubricant inserted into the groove 17, can flow over this flange and down through an annular space 20 on to the face of the upper ring, and in this way, a cascade system for the lubricant is provided. As shown in Fig. 2, lubricant may be introduced into the groove 17 by means of a passageway 21, which is formed in the upper ring, and is provided with a removable plug 22.

At this point it will be noted that the space 20 not only allows flow of the lubricant, but it permits the upper ring 13 to have side play.

The structure is completed by a nut 23, which engages the shank 7 and bears upon the upper balls 18. This nut may be adjusted to take up wear in the balls or races, and it may be locked in its adjusted positions by any suitable means, but it is preferred to lock the same by a cross pin 24, which may pass through an aperture 25 in the shank and cooperate with radial grooves 26, formed in the upper face of the nut 23.

From the foregoing it is believed that the construction, operation and advantages of the invention may be readily understood, and it is apparent that changes may be made in the details disclosed, without departing from the spirit of the invention, as expressed in the claims.

What is claimed and desired to be secured by Letters Patent is:

1. A caster including a fork having a shank, a race ring resting on the fork, rolling elements supported by the race ring, a second race ring carried by the rolling elements, rolling elements carried by the second race ring, and an adjustable member mounted on the shank and bearing against the last mentioned rolling elements.

2. In a caster, a fork provided with a threaded shank, upper and lower race rings surrounding the shank, the lower race ring resting on said fork, an annulus of bearing balls arranged between the race rings and supporting the upper race ring, another ball annulus of smaller diameter than the first mentioned annulus, resting on the upper ring, and a nut on said shank resting on the balls of the upper annulus.

3. A caster comprising a fork, a roller connected to the fork, a threaded shank extending from the fork, a shelf between the shank and fork, a lower race ring resting on the shelf and provided with an annular groove which is surrounded by an annular upstanding flange, a lower set of balls playing in said groove, an upper race ring resting on said balls and spaced from the lower ring, said upper ring having a groove in its upper face of smaller diameter than the groove in the lower ring, balls occupying the groove of the upper ring, and a member connected to the shank and bearing upon the balls of the upper ring, said member being spaced from the upper ring.

4. A caster including a fork provided with a shank, a race ring mounted on the fork and having a race in its upper surface, rolling elements supported by the race ring and engaging the race, a second race ring supported by the rolling elements and having a race, other rolling elements supported by the second ring and engaging the last mentioned race, a member adjustably mounted on the shank and bearing against the last mentioned rolling elements, each of said rings being provided with an upstanding annular flange to obstruct the discharge of lubricant from said races, and a passageway placing the races in communication.

In testimony whereof, I have signed this specification.

KENT E. WALTER.